May 1, 1951         F. SCHNEIDER         2,551,296
EQUIPMENT FOR REGENERATING ODOR ABSORBENTS
Filed Sept. 10, 1949
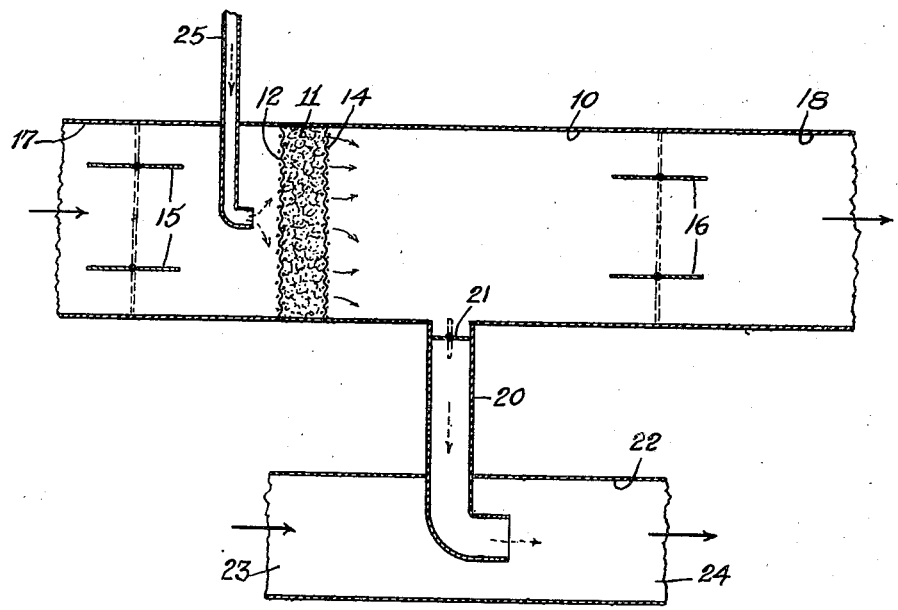
INVENTOR.
Frank Schneider
BY
Munn, Liddy & Glaccum
Attorneys Patented May 1, 1951

2,551,296

UNITED STATES PATENT OFFICE 2,551,296

EQUIPMENT FOR REGENERATING ODOR ABSORBENTS

Frank Schneider, Douglaston, N. Y.

Application September 10, 1949, Serial No. 115,030

2 Claims. (Cl. 183—4.5)

Many industries have met with the problem of disposing of odors or obnoxious materials resulting from the manufacture of various products. This problem is a serious one, particularly where the plant is located in a community and where the material in question is subject to condensation and will settle out of the atmosphere on homes, automobiles and in other places. The problem has been met in some instances by using odor absorbent materials such as activated carbon and other known absorbents. A problem arises, however, when the activated carbon or other absorbent becomes saturated and must be either replaced or regenerated. If the absorbent is discarded it may be very costly, or, if it is regenerated by the use of steam or inert gas the effect of such regeneration normally is to release the obnoxious matter, which usually results in a recurrence of the nuisance to a higher degree although in a shorter time.

An object of the invention is to provide a method and mechanism for regenerating absorbent material without permitting the odorous or obnoxious material to escape to the atmosphere to cause a nuisance.

A further object is to provide a mechanism whereby the absorbent material may be regenerated in situ without unduly interfering with the operation of the plant. I accomplish this result by treating the saturated absorbent with steam or gas usually used in regeneration and then adding sufficient air to the exhaust stream to permit one or more of the following effects: first, the mixture of steam or gas and air and absorbent material can be heated to a sufficiently high temperature to permit combustion of the absorbed material; secondly, the condensation of the steam, if this is used for a regeneration, can be prevented if sufficient air is added to hold the concentration of the steam below the saturation concentration for the temperatures involved; thirdly, the temperature of the exhaust steam or gas may be reduced by the addition of air to a point at which other disposal methods can be used for the absorbed material. In other words, the obnoxious material may be settled out as solids and disposed of without being released to the atmosphere.

In the accompanying drawing I show in cross-section a relatively simple construction with which my invention may be practiced. The purifying system consists of a suitable chamber 10 in which is mounted a bed 11 of absorbent material supported by porous members 12 and 14. At one end of the chamber are mounted dampers 15 while similar dampers 16 are mounted at the opposite end. In normal operation the air carrying the obnoxious material will enter the chamber 10 through the duct 17 and pass through the bed 11 and be released to the atmosphere through the duct 18 leading to a suitable stack or other outlet. Leading from the chamber 10 is a tube or passage 20, entry to which is controlled by the damper 21 which, in normal operation, is closed. The tube 20 is introduced into a chamber 22 which has an air inlet end 23 and an outlet end 24. Provision is made for introducing steam into the chamber 10 by means of the pipe 25.

In normal operation the dampers 15 and 16 are open and the air passes from the duct 17 into the chamber 10 through the bed of absorbent material 11 and out through the dampers 16. When the bed 11 becomes saturated, or nearly so, the dampers 16 are closed and the damper 21 open. Steam is introduced through the passage 25 to regenerate the bed 11 and the steam and absorbent material will pass through the damper 21 into the chamber 22. Pure air is introduced into the chamber 22 through the inlet end 23 and mixed with the steam and absorbent material and is then passed out of the chamber 22 through the outlet end 24 to a burner or other disposal device. Naturally, where the absorbed material is combustible it may readily be burned. Where the material contains a large amount of solids it may more readily be settled, or, in certain instances, the addition of the air into the chamber 22 will hold the concentration of the steam sufficiently below the saturation point to allow the air stream to be released in the atmosphere.

I claim:

1. In a chamber for the removal of obnoxious material from an air-stream having a bed of absorbent material, the improvement which consists of dampers at either end of said chamber, a duct leading from said chamber to a second chamber, means for introducing pure air into said second chamber, a damper in said duct, means for introducing steam into said first mentioned chamber, whereby the dampers leading to the atmosphere from the first mentioned chamber may be closed, the damper in said duct opened and steam introduced to regenerate said bed and to carry absorbed material from said bed through said duct into an air-stream passing through said second mentioned chamber.

2. A system for removing obnoxious matter and odors by means of an absorbent material including a chamber through which gas bearing material to be removed is passed, a screen of absorbent material positioned in said chamber, means to close the end of said chamber, a steam jet for regenerating the absorbent material, a second chamber, a duct connecting the first and second chambers whereby when the end of the first mentioned chamber is closed and the steam turned on, the steam will pass through said absorbent material to regenerate it and remove the material absorbed through said duct into said second chamber, and means to supply additional air to said second chamber to mix with said steam and absorbed materials.

FRANK SCHNEIDER.

REFERENCES CITED

The following references are of record in the file of this patent:

UNITED STATES PATENTS

| Number | Name | Date |
|---|---|---|
| 296,791 | Smith | Apr. 15, 1884 |
| 2,114,810 | Ray | Apr. 19, 1938 |
| 2,413,771 | Luaces | Jan. 7, 1947 |